April 6, 1948.  A. MAHREN  2,438,932
METHOD AND MEANS FOR TESTING CABLES
Filed Sept. 23, 1943
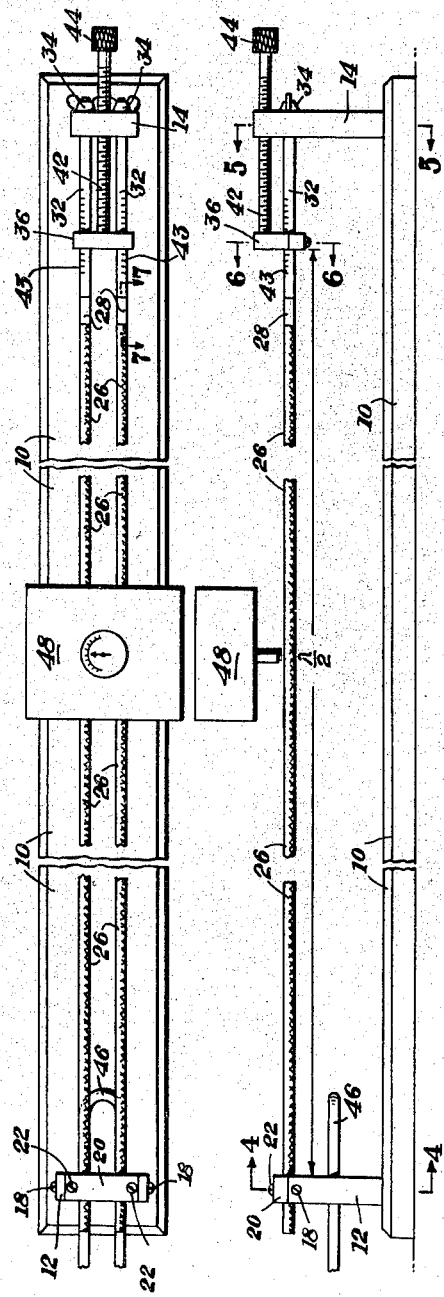
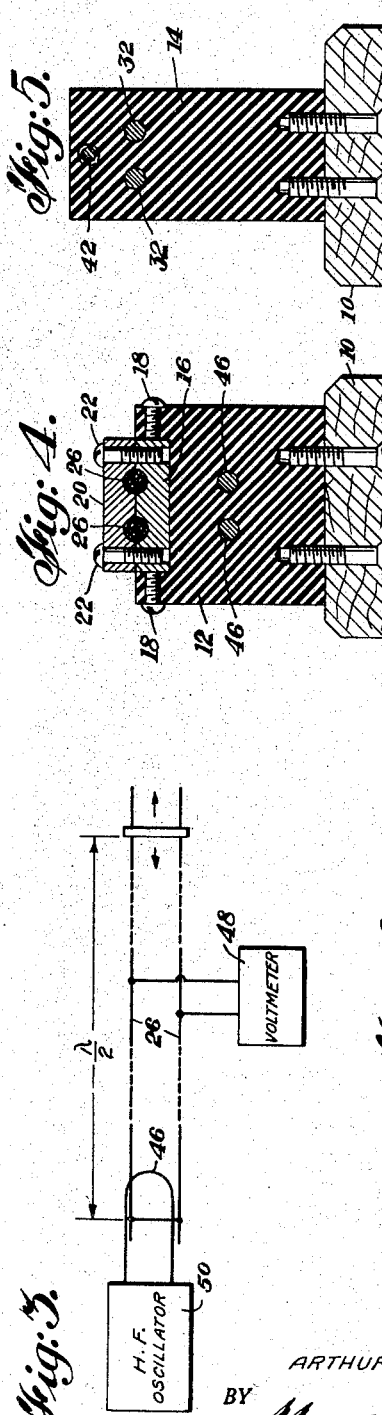
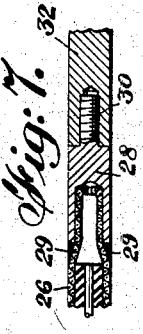
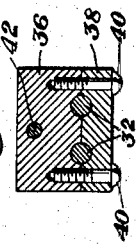
INVENTOR.
ARTHUR MAHREN
BY
ATTORNEY Patented Apr. 6, 1948

2,438,932

UNITED STATES PATENT OFFICE 2,438,932

METHOD AND MEANS FOR TESTING CABLES

Arthur Mahren, Long Island City, N. Y., assignor to Federal Telephone and Radio Corporation, East Newark, N. J., a corporation of Delaware Application September 23, 1943, Serial No. 503,508

8 Claims. (Cl. 175—183)

This invention relates to improvements in methods and means for testing cables, and more particularly to the testing of a braided cable line at ultra-high frequencies.

An object of this invention is to provide a novel method and means for determining the characteristics of a braided cable line at ultra-high frequencies.

Another object of this invention is to obtain the resistance, including the radiation resistance of a braided cable line at ultra-high frequencies.

More specifically, the invention is directed to a method and means for obtaining the conductor resistance of a braided cable line at high frequencies, by first obtaining the radiation resistance of a comparable low-loss dual line, and then obtaining the total resistance of the braided cable dual line, whereby the conductor resistance alone of the braided cable dual line can then be calculated.

Other and additional objects and advantages of the present invention, together with desirable details of construction and improved combinations of parts, will be hereinafter described and particularly pointed out in the claims. I attain these objects by the constructions shown in the annexed drawings, wherein:

Fig. 1 is a top plan view of cable testing apparatus formed in accordance with the present invention;

Fig. 2 is a side view of the same testing apparatus;

Fig. 3 is a circuit diagram illustrating an electrical testing circuit utilizing the apparatus shown in Figs. 1 and 2;

Fig. 4 is an enlarged transverse cross-sectional view taken along the line 4—4 of Fig. 2;

Fig. 5 is an enlarged transverse cross sectional view taken along the line 5—5 of Fig. 2;

Fig. 6 is an enlarged transverse cross-sectional view taken along the line 6—6 of Fig. 2; and Fig. 7 is an enlarged longitudinal section taken along the line 7—7 of Fig. 1.

The general nature of the cable testing apparatus according to the present invention can best be ascertained from the top and side views shown in Figs. 1 and 2. The apparatus may consist of a base member 10, of wood or other insulating material, near whose opposite ends are attached a pair of longitudinally spaced uprights 12 and 14 also preferably of insulating material. The upright 12, shown in more detail in Fig. 4, is formed with a notch in its upper surface adapted to receive the lower half 16 of a metal clamp, this clamp half being held in place in the notch by suitable means such as screws 18. The upper half 20 of the clamp may be attached to the lower half 16 by means such as screws 22, the two opposing portions of the clamp being formed with openings adapted to receive the material to be tested, in this case the ends of two braided cables 26. The other ends of the cables have attached thereto, connecting ferrules 28 which are formed hollow in one end to receive the cable braid at the far end, connection to these connecting ferrules being made with the braid as by soldering them thereto, as indicated at 29 in Fig. 7. The other end of each ferrule is provided with a threaded extension 30 for connection to metal rods 32 which may be preferably silver coated. These rods are, in turn, supported by the upright 14, preferably having a threaded end extending through the upright and being attached thereto as by wing nuts 34. Fig. 5 shows the upright 14 in cross-section, with the rods 32 passing therethrough. By the arrangement just described the braided cable 26 is accordingly stretched tightly between the uprights 12 and 14.

Slidably mounted on the rods 32 is a slidable short-circuiting bar shown in more detail in Fig. 6. This short-circuiting bar may consist of a pair of opposed members 36 and 38 held together by means such as screws 40, and providing between them openings surrounding the rods 32. A threaded rod 42 extends through the upright 14 and is rotatably connected to the upper portion 36 of the slidable short-circuiting bar. The outer end of the threaded bar 42 may be provided with an insulating operating knob 44. It will be clear to those skilled in this art that rotation of the knob 44 with consequent rotation of the rod 42 in the upright 14 will cause longitudinal sliding movement of the short-circuiting bar on the rods 32. Since the exact position of this short-circuiting bar on the rods 32 is of importance in calculating the resistance of the braided cable 26, the rods 32 may have engraved thereon certain indicia indicated at 43 and spaced in proper measuring units. Energy is supplied to the line to be tested by means such as a coupling loop 46 which may extend through and be supported by the insulating upright 12. Indicating means such as a portable vacuum tube voltmeter 48 can be coupled to the line to be tested, preferably at its mid-point.

The electrical circuit of the complete testing apparatus is more clearly indicated in Fig. 3. This shows a high frequency oscillator 50 supplying high frequency energy to the coupling loop 46, coupling, in turn, to the two braided cables forming a dual line. In accordance with the test methods followed, the length of the line to be tested, from the short-circuiting clamp positioned on the top of upright 12 to the median position of the slidable short-circuiting bar should be substantially physically equal and electrically equal to half the wave length of the oscillator frequency, while the vacuum tube voltmeter 48 is coupled to the line at the maximum voltage point, or at a quarter wavelength point of the input frequency.

In order to calculate the resistance of a dual braided cable line in accordance with the present invention, the apparatus can be calibrated by first using a pair of silver-plated conductors attached in the testing apparatus similarly to the braided conductors under test. The resistance of these silver-plated conductors can then be measured by shifting the short-circuiting bar until a maximum resonance voltage reading at the quarter wave length point of the two conductors is obtained. The short-circuiting bar is then moved first in one direction and then in the other direction to detune the circuit until voltage readings of .707 of the maximum at both positions of the short-circuiting bar is obtained. The distance between the two extreme positions of the short-circuiting bar is then measured and the resistance of the silver-plated conductors can be calculated from the formula:

$$R = Z_0 \tan \frac{2\pi \Delta l}{\lambda}$$

where

R = resistance of line;
$Z_0$ = characteristic impedance of line;
$\Delta l$ = distance that short-circuit bar moves from .707 to .707 on opposite sides of the point of resonance (in centimeters); and
$\lambda$ = wavelength of oscillator (in centimeters).

The resistance of silver-plated conductors measured in this manner will consist almost entirely of radiation resistance.

In place of the silver-plated conductors the two braided cables forming the dual line are then placed in the testing apparatus in the manner aforescribed, the maximum voltage or resonance setting obtained, and the slidable short-circuiting bar moved to points equivalent to .707 maximum voltage on each side of resonance. This distance is again measured and the total resistance of the braided dual line can be calculated from the above formula. However, the value thus obtained will include both radiation resistance and conductor resistance of the braided cable. The actual conductor resistance of such a dual line can then be obtained by subtracting the radiation resistance as calculated by the line standardizing test, from the value obtained by the formula when testing the braided cable.

In all cases the conductors are so spaced from one another that the radiation resistance is at a minimum. The apparatus disclosed is so designed as to permit the testing of cables within a limited range of frequencies, but obviously if the frequency range is such that longer or shorter test pieces are needed to obtain a test line having a length equal to half the wave length of the oscillator frequency, one or both of the supporting uprights could be made longitudinally shiftable. Various other parts of the apparatus may be varied in manners which will be obvious to those skilled in this art. For example, the slidable short-circuiting bar may be formed with knife-edged contacts to increase readability and accuracy. The particular type of connector between the joint of the cable to be tested and the end conductors 32 can also be changed without departing from this invention, it only being necessary that a good electrical connection be possible and that a uniform conductor diameter between the braided cable and the supporting rods be maintained for most accurate results.

Accordingly, while I have described above the principles of my invention in connection with a specific device, and particular modifications thereof, it is to be clearly understood that this description is made only by way of example and not as a limitation on the scope of my invention as set forth in the objects and the accompanying claims.

I claim:

1. Braided cable line testing apparatus including, in combination, a base, a pair of uprights on opposite ends of said base, metallic means on one of said uprights for clamping a pair of braided cables in spaced relationship, a pair of spaced metal rods attached to the other upright and extending longitudinally toward the first upright, means for attaching the braid on the other ends of the cables to said rods to hold the cables in parallel relationship between said rods and said clamping means, a short-circuiting bar longitudinally slidable on said metal rods, and means supported from said other upright controlling the position of said short-circuiting bar.

2. The combination according to claim 1, in combination with a high frequency energy source, means adapted to couple said high frequency energy source to the cables near said first upright, output indicating means, and means adapted to couple said output indicating means to said cables substantially midway between said metal clamping means and said short-circuiting bar.

3. The combination according to claim 1, in combination with a high frequency energy source, means adapted to couple said high frequency energy source to the cables near said first upright, output indicating means, and means adapted to couple said output indicating means to said cable substantially midway between said metal clamping means and said short-circuiting bar, and in which the length of each cable between said clamping means at one end and the short-circuiting bar at its other end is substantially equal to one half the wave length of the output frequency from said high frequency energy source.

4. Braided cable line testing apparatus including, in combination, a base, a pair of uprights of insulating material mounted on opposite ends of said base, a metal clamp attached to one of said uprights, said metal clamp having a pair of spaced openings adapted to receive two braided cables, a pair of spaced metal rods supported by the other uprights and extending longitudinally toward the first upright, means for attaching the braid on the other ends of the cables to said rods to hold the cables in parallel relation between said rods and said metal clamp, a short-circuiting bar longitudinally slidable on said metal bars, and means supported from said other upright controlling the position of said short-circuiting bar.

5. The combination according to claim 4, in combination with an input coupling loop adapted to be supported by said first upright in coupling relationship with the two cables.

6. The combination according to claim 4, in which the means for controlling the position of said short-circuiting bar comprises a threaded rod, threadably mounted in the other upright and rotatably connected to said short-circuiting bar, and in which said rods are provided with indicia for indicating the position of said short-circuiting bar thereon.

7. Braided cable line testing apparatus including, in combination, a pair of spaced uprights of insulating material, a metal clamp attached to one of said uprights, said metal clamp having a pair of spaced openings adapted to receive two braided cables, a pair of spaced metal rods supported by the other of said uprights and extending longitudinally toward the first upright, means for attaching the braid on the other ends of the cables to said rods, means for longitudinally shifting and fixing the position of said rods in said other uprights, whereby said cable is adapted to be stretched between said rods and said metal clamp, a short-circuiting bar longitudinally slidable upon said metal bars, and means supported from said other upright, controlling the position of said short-circuiting bar.

8. The method of determining the characteristics of a braided cable line at high frequencies which comprises the steps of providing a pair of spaced-apart metal rods having a surface of relatively low resistance material, the diameters of said rods corresponding to that of the braided cable to be measured, applying high frequency energy to said metal rods, the wave length of said high frequency energy being selected to be substantially twice the physical length of said rods, measuring the effective resistance of said rods, applying the same high frequency energy to a pair of similarly spaced-apart braided cables each having a physical length substantially equal to that of said metal rods and to one-half the wave length of the high frequency energy, and measuring the effective resistance of said braided cables, whereby the conductor resistance of said braided cable line will be substantially equal to the measured resistance thereof less the measured resistance of the two metal rods.

ARTHUR MAHREN.

REFERENCES CITED

The following references are of record in the file of this patent:

UNITED STATES PATENTS

| Number | Name | Date |
| --- | --- | --- |
| 2,117,090 | Grundmann | May 10, 1938 |
| 2,191,271 | Carter | Feb. 20, 1940 |
| 2,159,782 | Conklin et al. | May 23, 1939 |
| 2,238,262 | Happe, Jr., et al. | Apr. 15, 1941 |

OTHER REFERENCES

Nergaard: A Survey of Ultra-High-Frequency Measurements; R. C. A. Publication No. ST-144, October 1938; pages 181-190.